(12) United States Patent
Agrawal et al.

(10) Patent No.: US 12,322,199 B2
(45) Date of Patent: Jun. 3, 2025

(54) IDENTIFYING OCCLUDED OBJECTS IN ENGINEERING DRAWINGS

(71) Applicant: International Business Machines Corporation, Armonk, NY (US)

(72) Inventors: Aneesh Agrawal, Holmdel, NJ (US); Pranita Sharad Dewan, New York, NY (US); Dinesh C. Verma, New Castle, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 17/651,113

(22) Filed: Feb. 15, 2022

(65) Prior Publication Data

US 2023/0260312 A1 Aug. 17, 2023

(51) Int. Cl.
*G06V 30/422* (2022.01)
*G06T 7/68* (2017.01)
(Continued)

(52) U.S. Cl.
CPC ............. *G06V 30/422* (2022.01); *G06T 7/68* (2017.01); *G06V 10/273* (2022.01);
(Continued)

(58) Field of Classification Search
CPC ... G06T 2207/20081; G06T 7/68; G06T 7/60; G06V 10/273; G06V 10/774; G06V 30/414; G06V 30/413; G06V 30/422
(Continued)

(56) References Cited

U.S. PATENT DOCUMENTS

| 2002/0057838 A1* | 5/2002 | Steger ................ G06V 10/7515 |
| | | 382/197 |
| 2012/0170805 A1* | 7/2012 | Brown .................. G06F 18/214 |
| | | 382/103 |

(Continued)

FOREIGN PATENT DOCUMENTS

| CN | 105302930 B | 11/2018 |
| CN | 110796016 A | 2/2020 |

OTHER PUBLICATIONS

Nayef, N. (2013). Geometric-based symbol spotting and retrieval in technical line drawings (Doctoral dissertation, Technische Universität Kaiserslautern). (Year: 2013).*

(Continued)

*Primary Examiner* — Chineyere Wills-Burns
*Assistant Examiner* — Emmanuel Silva-Avina
(74) *Attorney, Agent, or Firm* — Monchai Chuaychoo

(57) ABSTRACT

In an approach to identifying occluded objects, a computer retrieves a first image that includes an object at least partially occluded by one or more occlusions. A computer removes the one or more occlusions from the first image to create a partial object in a second image. A computer runs a detection model with the second image to predict one or more identifications of a symbol represented by the partial object. A computer determines top predictions of the one or more identifications of the symbol by the detection model. A computer identifies at least one geometric property associated with the one or more identifications of the symbol included in the one or more top predictions. A computer applies the at least one geometric property to the partial object. A computer determines a probability of the one or more top predictions correctly identifying the symbol represented by the partial object.

20 Claims, 5 Drawing Sheets

ORIGINAL

OCCLUDED

LED       DIODE

(51) Int. Cl.
    *G06V 10/26*     (2022.01)
    *G06V 10/774*     (2022.01)
    *G06V 30/414*     (2022.01)

(52) U.S. Cl.
    CPC .......... *G06V 10/774* (2022.01); *G06V 30/414* (2022.01); *G06T 2207/20081* (2013.01)

(58) Field of Classification Search
    USPC ........................................................ 382/113
    See application file for complete search history.

(56) References Cited

U.S. PATENT DOCUMENTS

| | | | |
|---|---|---|---|
| 2020/0363815 | A1 | 11/2020 | Mousavian |
| 2021/0089767 | A1 | 3/2021 | Ashek |
| 2021/0319340 | A1* | 10/2021 | Shabtay .................. G06N 5/04 |
| 2021/0349614 | A1* | 11/2021 | Daily ....................... G06F 8/60 |
| 2022/0254181 | A1* | 8/2022 | Antoniazzi ........ G06V 30/1473 |

OTHER PUBLICATIONS

Pei, Z., Li, Y., Ma, M., Li, J., Leng, C., Zhang, X., & Zhang, Y. (2019). Occluded-object 3D reconstruction using camera array synthetic aperture imaging. Sensors, 19(3), 607. (Year: 2019).*

Koltun, G., Mäurer, F., Knoll, A., Trunzer, E., & Vogel-Heuser, B. (Oct. 2018). Information retrieval from redlined circuit diagrams and its model-based representation for automated engineering. In IECON 2018—44th Annual Conference of the IEEE Industrial Electronics Society (pp. 3114-3119). IEEE. (Year: 2018).*

Ablameyko et al., "Recognition of Engineering Drawing Entities: Review of Approaches", International Journal of Image and Graphics, vol. 07, No. 4, Jan. 30, 2007, 25 Pages.

Chandel et al., "Occlusion Detection and Handling: A Review", International Journal of Computer Applications, vol. 120, No. 10, Jun. 2015, 7 Pages.

Elyan et al., "Symbols Classification in Engineering Drawings", 2018 International Joint Conference on Neural Networks (IJCNN), 2018, 8 Pages.

Han et al., "TransHist: Occlusion-Robust Shape Detection in Cluttered Images", Computational Visual Media, vol. 4, No. 2, Mar. 2018, 12 Pages.

Huggins et al., "Finding Folds: on the Appearance and Identification of Occlusion", 2001 IEEE Computer Society Conference on Computer Vision and Pattern Recognition (CVPR 2001), with CD-ROM, Dec. 8-14, 2001, Kauai, HI, USA, 9 Pages.

Jung et al., "Object Occlusion Detection Using Automatic Camera Calibration for a Wide-Area Video Surveillance System", Sensors, vol. 16, No. 7, Jun. 25, 2016, 11 Pages.

Kang et al., "A Digitization and Conversion Tool for Imaged Drawings to Intelligent Piping and Instrumentation Diagrams (P&ID)", Energies, 2019; 12(13): 2593, Jul. 5, 2019, 26 Pages.

Marion et al., "Label Fusion: A Pipeline for Generating Ground Truth Labels for Real RGBD Data of Cluttered Scenes", 2018 IEEE International Conference on Robotics and Automation (ICRA), Brisbane, Australia, May 21-25, 2018, 8 Pages.

Moreno-García et al., "Heuristics-Based Detection to Improve Text/Graphics Segmentation in Complex Engineering Drawings", In: Boracchi G., Iliadis L., Jayne C., Likas A. (eds) Engineering Applications of Neural Networks, EANN 2017, Communications in Computer and Information Science, vol. 744, 2017, 12 Pages.

Price et al., "Inferring Occluded Geometry Improves Performance when Retrieving an Object from Dense Clutter", arXiv:1907.08770v2 [cs.RO], Sep. 4, 2019, 16 Pages.

Sengupta et al., "Identifying Occluded Objects in Images Using Object Vector Representations", SE 575 Statistical Machine Learning, Arizona State University, USA, 2017, 14 Pages.

Sushkov et al., "Local Image Feature Matching for Object Recognition", 2010 11th International Conference on Control Automation Robotics & Vision, Singapore, Dec. 7-10, 2010, 7 Pages.

Zhao et al., "Occluded-Object 3D Reconstruction Using Camera Array Synthetic Aperture Imaging", Sensors, vol. 19, No. 3, Jan. 31, 2019, 22 Pages.

\* cited by examiner

IDENTIFYING OCCLUDED OBJECTS IN ENGINEERING DRAWINGS

BACKGROUND OF THE INVENTION

The present invention relates generally to the field of image analysis, and more particularly to identifying occluded objects in engineering drawings.

Most engineering drawings consist of a finite set of well-defined symbols. The aspect ratio and/or general shape stays constant for a symbol as opposed to a natural object. While digitizing images of engineering drawings, it may be difficult to identify any symbols or objects in the drawings that are occluded for one or more various reasons. For example, parts of symbols may be covered by a stamp or other label. In another example, smudges and/or tears can impact parts of an image. In a further example, ink blotches may mask certain parts of a diagram. While the set of symbols is predetermined, identifying partial symbols can be difficult and cause inaccuracies in image analyses. Many partial symbols look similar to each other. Some symbols have only one feature that distinguishes them from another symbol, and the distinguishing features may be hidden.

For example, FIG. 1A depicts capacitor symbol 102 and battery symbol 104, both free of occlusions and partially covered by occlusion 106 and occlusion 108, respectively. The difference between capacitor symbol 102 and battery symbol 104 is a variation in line length and curvature. Because of the placement of occlusion 106 and occlusion 108, the partially occluded symbols are difficult to distinguish from each other. In another example, FIG. 1B depicts light emitting diode (LED) symbol 110 and diode symbol 112, both free of occlusions and partially covered by occlusion 114 and occlusion 116, respectively. The difference between LED symbol 110 and diode symbol 112 is the presence of two small arrows included in LED symbol 110. Because of the placement of occlusion 114 and occlusion 116, the partially occluded symbols are difficult to distinguish from each other.

There are several existing occluded image recognition techniques. For example, one technique is to stitch together multiple camera angles to collect 3D properties, such as information on depth estimation, shadows, and velocity of moving objects, to rebuild shapes of occluded objects. This technique cannot be applied to shadowless drawings of 2D symbols and a single overhead view. In another example, a feature matching technique is applied to match localized sections of a given shape using pyramid arc-length descriptors (PAD) to find curves and/or edges in a given image that match the local sections of a queried object. This technique requires knowledge of the exact features of a shape to match and would not be accurate when matching a wide range of symbols with different local features. In yet another example, a technique includes using captions and a relational graph of simultaneously occurring natural objects to predict fully occluded objects. The technique analyzes captions of the image using natural language processing (NLP) to generate a list of objects present in the image, then feeds the list to a word-to-vector model to predict the likelihood of the missing object based on relational graphs between frequent simultaneous objects. Because engineering drawings have no captions, NLP cannot generate a list of objects for an engineering drawing. Further, the presence of an engineering symbol on a drawing does not provide context for the presence of another engineering symbol.

SUMMARY

A first aspect of the present invention discloses a computer-implemented method including a computer retrieving a first image that includes an object at least partially occluded by one or more occlusions. A computer removes the one or more occlusions from the first image to create a second image, where the object in the first image is a partial object in the second image. A computer runs a detection model with the second image to predict one or more identifications of a symbol represented by the partial object. A computer determines one or more top predictions of the one or more identifications of the symbol by the detection model. A computer identifies at least one geometric property associated with the one or more identifications of the symbol included in the one or more top predictions. A computer applies the at least one geometric property to the partial object. Based on the applied at least one geometric property, a computer determines a probability of each of the one or more top predictions correctly identifying the symbol represented by the partial object. The present invention has the advantage of using geometric properties, such as symmetry, for object identification over known techniques that use multiple camera angles with 3D images because geometric properties, such as pose estimation and axis of symmetry location, are difficult with 3D objects.

A second aspect of the present invention discloses a computer program product including one or more computer readable storage media and program instructions collectively stored on the one or more computer readable storage media. The stored program instructions include program instructions to retrieve a first image that includes an object at least partially occluded by one or more occlusions. The stored program instructions include program instructions to remove the one or more occlusions from the first image to create a second image, where the object in the first image is a partial object in the second image. The stored program instructions include program instructions to run a detection model with the second image to predict one or more identifications of a symbol represented by the partial object. The stored program instructions include program instructions to determine one or more top predictions of the one or more identifications of the symbol by the detection model. The stored program instructions include program instructions to identify at least one geometric property associated with the one or more identifications of the symbol included in the one or more top predictions. The stored program instructions include program instructions to apply the at least one geometric property to the partial object. The stored program instructions include program instructions to determines a probability of each of the one or more top predictions correctly identifying the symbol represented by the partial object based on the applied at least one geometric property.

A third aspect of the present invention discloses a computer system including one or more computer processors and one or more computer readable storage media, where program instructions are collectively stored on the one or more computer readable storage media. The stored program instructions include program instructions to retrieve a first image that includes an object at least partially occluded by one or more occlusions. The stored program instructions include program instructions to remove the one or more occlusions from the first image to create a second image, where the object in the first image is a partial object in the second image. The stored program instructions include program instructions to run a detection model with the second image to predict one or more identifications of a symbol represented by the partial object. The stored program instructions include program instructions to determine one or more top predictions of the one or more identifications of the symbol by the detection model. The stored program instructions include program instructions to identify at least one geometric property associated with the one or more identifications of the symbol included in the one or more top predictions. The stored program instructions include program instructions to apply the at least one geometric property to the partial object. The stored program instructions include program instructions to determines a probability of each of the one or more top predictions correctly identifying the symbol represented by the partial object based on the applied at least one geometric property.

In another aspect, the present invention discloses a method for identifying occluded objects in engineering drawings including one or more computer processors determine that text associated with the partial object is present in the second image. One or more computer processors apply the text associated with the partial object to the partial object, and where determining the probability of each of the one or more top predictions correctly identifying the symbol represented by the partial object is further based on the applied text associated with the partial object. An advantage of using contextual information, such as associated text, for object identification over known techniques that analyze captions of an image to generate a list of objects present in the image, and then feed the list to a word-to-vector model to predict the likelihood of the missing object based on relational graphs is that the presence of an engineering symbol provides little implication for the presence of another symbol, and, therefore, an applicable word-to-vector model and relational graph cannot be produced.

In yet another aspect, the present invention discloses a method for identifying occluded objects in engineering drawings including one or more computer processors determining that one or more additional characteristics associated with the partial object are present in the second image. One or more computer processors apply the one or more additional characteristics associated with the partial object to the partial object, and where determining the probability of each of the one or more top predictions correctly identifying the symbol represented by the partial object is further based on the one or more additional characteristics associated with the partial object. An advantage of using additional characteristics, such as subcomponents, for object identification over known techniques that match localized sections of a given shape using PAD to find curves and/or edges in a given image is that finding partially matching curves may not result in object identification with a required accuracy.

DETAILED DESCRIPTION

Embodiments of the present invention recognize that improvements to confidence in identification of occluded objects in engineering drawings may be made by implementing a method of occluded object identification that uses a detection model trained with occluded versions of images from an appropriate dataset. Embodiments of the present invention also recognize that improvements to confidence in identification of occluded objects may be made by using contextual properties such as symmetry, color, associated text, and subcomponents, to inform a prediction. Embodiments of the present invention further recognize that solutions may be domain specific, but the general techniques of identifying occluded objects can remain the same across different types of drawings. Implementation of embodiments of the invention may take a variety of forms, and exemplary implementation details are discussed subsequently with reference to the Figures.

Figure 1A:
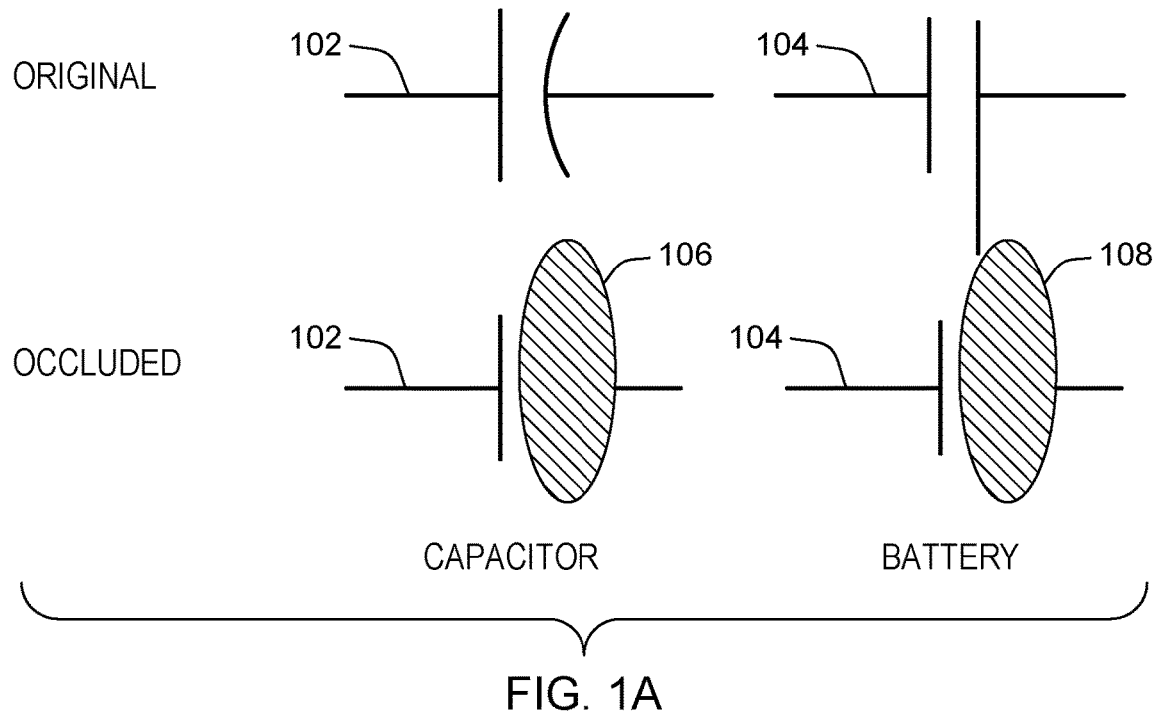
FIG. 1A depicts an example of original and occluded engineering drawing symbols, in accordance with an embodiment of the present invention.
Figure 1B:
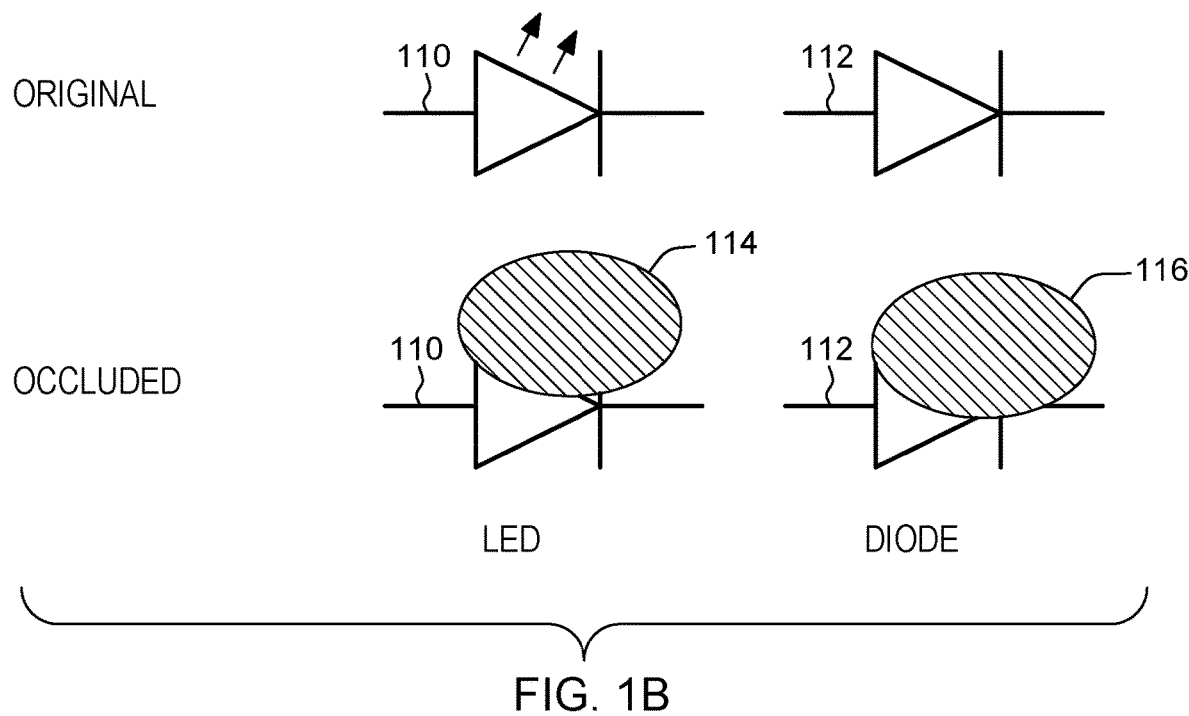
FIG. 1B depicts another example of original and occluded engineering drawing symbols, in accordance with an embodiment of the present invention.
Figure 2:
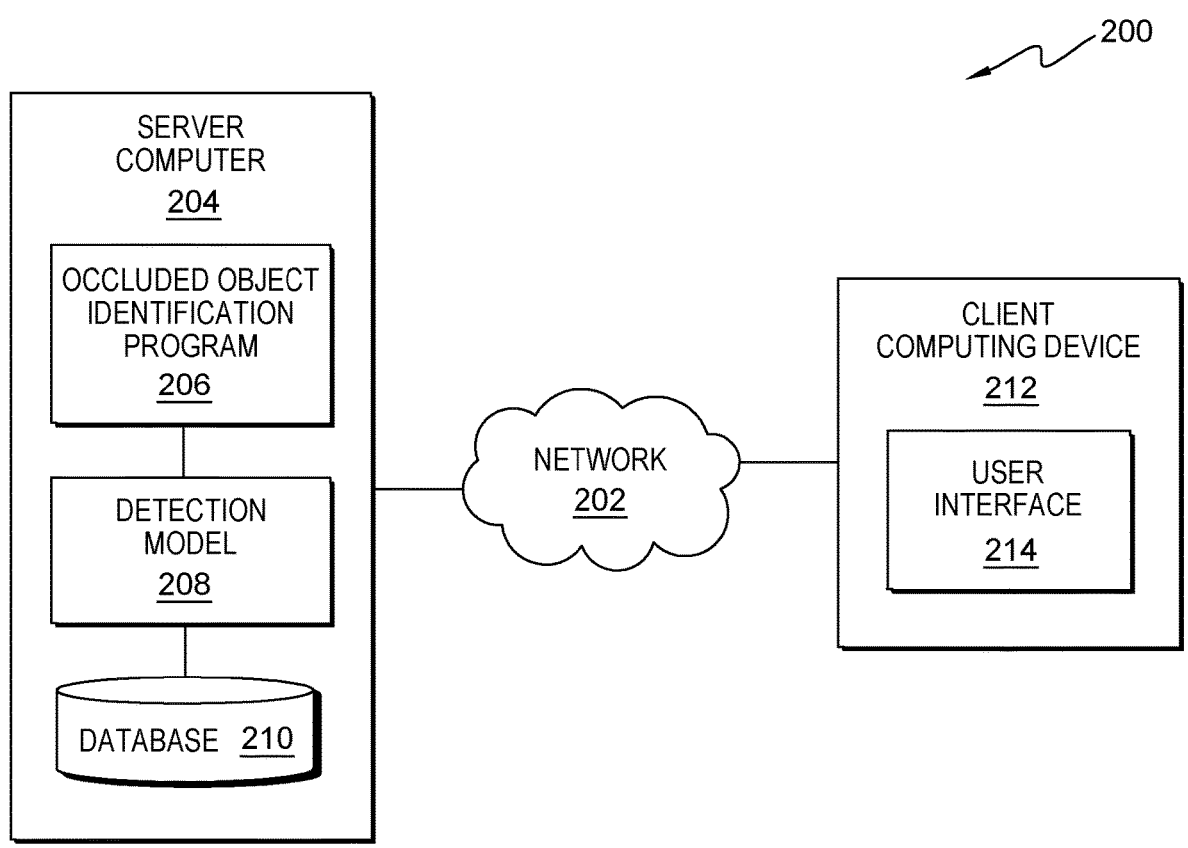
FIG. 2 is a functional block diagram illustrating a distributed data processing environment, in accordance with an embodiment of the present invention.

FIG. 2 is a functional block diagram illustrating a distributed data processing environment, generally designated 200, in accordance with one embodiment of the present invention. The term "distributed" as used herein describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 200 includes server computer 204 and client computing device 212 interconnected over network 202. Network 202 can be, for example, a telecommunications network, a local area network (LAN), a wide area network (WAN), such as the Internet, or a combination of the three, and can include wired, wireless, or fiber optic connections. Network 202 can include one or more wired and/or wireless networks capable of receiving and transmitting data, voice, and/or video signals, including multimedia signals that include voice, data, and video information. In general, network 202 can be any combination of connections and protocols that will support communications between server computer 204 and client computing device 212, and other computing devices (not shown) within distributed data processing environment 200.

Server computer 204 can be a standalone computing device, a management server, a web server, a mobile computing device, or any other electronic device or computing system capable of receiving, sending, and processing data. In other embodiments, server computer 204 can represent a server computing system utilizing multiple computers as a server system, such as in a cloud computing environment. In another embodiment, server computer 204 can be a laptop computer, a tablet computer, a netbook computer, a personal computer (PC), a desktop computer, a personal digital assistant (PDA), a smart phone, or any programmable electronic device capable of communicating with client computing device 212 and other computing devices (not shown) within distributed data processing environment 200 via network 202. In another embodiment, server computer 204 represents a computing system utilizing clustered computers and components (e.g., database server computers, application server computers, etc.) that act as a single pool of seamless resources when accessed within distributed data processing environment 200. Server computer 204 includes occluded object identification program 206, detection model 208, and database 210. Server computer 204 may include internal and external hardware components, as depicted and described in further detail with respect to FIG. 5.

Occluded object identification program 206 identifies partially occluded objects, i.e., symbols, in digitized engineering drawings by generating training data for detection model 208 from an appropriate symbol dataset and, using the trained detection model, determining the probable symbols behind an occlusion. To generate training data for detection model 208, occluded object identification program 206 retrieves an appropriate dataset and generates occluded versions of images within the dataset. Occluded object identification program 206 adds the occluded versions of the images to the dataset and stores the augmented dataset. To determine one or more probable symbols behind an occlusion, occluded object identification program 206 retrieves an engineering drawing. Occluded object identification program 206 identifies and removes one or more occlusions from an image. Occluded object identification program 206 runs detection model 208. Occluded object identification program 206 determines the top predictions of detection model 208. Occluded object identification program 206 identifies geometric properties of each top prediction. Occluded object identification program 206 applies the geometric properties to the image. Occluded object identification program 206 determines whether associated text is present, and, if so, applies information from the associated text. Occluded object identification program 206 determines whether any additional characteristics are present, and, if so, applies information from the additional characteristics. Occluded object identification program 206 determines the probability of each top prediction being the correctly identified occluded object. Occluded object identification program 206 is depicted and described in further detail with respect to FIG. 3 and FIG. 4.

Detection model 208 is one or more of a plurality of object detection technology software packages that can detect a specified object or portion of an object in a digital image or video. Object detection is based on the concept that every object class has its own special features that help in classification, such as all circles are round. For example, when looking for circles, detection model 208 detects objects that are at a particular distance from a point (i.e., the center). Similarly, when looking for squares, detection model 208 detects objects that are perpendicular at corners and have equal side lengths. In another example, detection model 208 may look for a bounding box or pixel level labels on the image, e.g., detecting a bounding box on the image as a symbol that represents a resistor.

Database 210 stores information used by and generated by occluded object identification program 206 and/or detection model 208. In the depicted embodiment, database 210 resides on server computer 204. In another embodiment, database 210 may reside elsewhere within distributed data processing environment 200, provided that occluded object identification program 206 and detection model 208 have access to database 210. A database is an organized collection of data. Database 210 can be implemented with any type of storage device capable of storing data and configuration files that can be accessed and utilized by occluded object identification program 206, such as a database server, a hard disk drive, or a flash memory. Database 210 stores one or more engineering drawings as well as one or more datasets of objects and/or symbols associated with one or more types of engineering drawings. As used herein, engineering drawings include, but are not limited to, construction drawings, mechanical drawings, blueprints, electrical schematics, circuitry layouts, telecom schematics, flowcharts, and any other type of technical drawing and/or diagram with an associated set of objects and/or symbols that represents the flow or constitution of a circuit, a process, a plant, or a device. In one embodiment, the one or more datasets are publicly available. In another embodiment, the one or more datasets are proprietary symbols that belong to the entity with which the user of client computing device 212 is associated. In an embodiment, database 210 also stores information associated with the datasets of objects and/or symbols, such as definitions, usage rules, policies, context, etc. For example, database 210 may store usage rules for text associated with a symbol, such as a required spatial proximity of the text to the symbol. Database 210 also stores training data generated by occluded object identification program 206 to train detection model 208. Further, database 210 stores predictions of object and/or symbol identification made by detection model 208. In addition, database 210 stores probabilities of object and/or symbol identification determined by occluded object identification program 206.

Client computing device 212 can be one or more of a laptop computer, a tablet computer, a smart phone, smart watch, a smart speaker, or any programmable electronic device capable of communicating with various components and devices within distributed data processing environment 200, via network 202. Client computing device 212 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 212 may be integrated into a vehicle of the user. For example, client computing device 212 may include a heads-up display in the windshield of the vehicle. In general, client computing device 212 represents one or more programmable electronic devices or combination of programmable electronic devices capable of executing machine readable program instructions and communicating with other computing devices (not shown) within distributed data processing environment 200 via a network, such as network 202. Client computing device 212 includes an instance of user interface 214.

User interface 214 provides an interface between a user of client computing device 212 and occluded object identification program 206 on server computer 204. In one embodiment, user interface 214 is mobile application software. Mobile application software, or an "app," is a computer program designed to run on smart phones, tablet computers and other mobile devices. In one embodiment, user interface 214 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 214 enables a user of client computing device 212 to request occluded object identification program 206 to analyze an engineering drawing for occluded object identification. User interface 214 also enables a user of client computing device 212 to receive analysis results from occluded object identification program 206. In addition, user interface 214 enables a user of client computing device 212 to send an engineering drawing to occluded object identification program 206.

Figure 3:
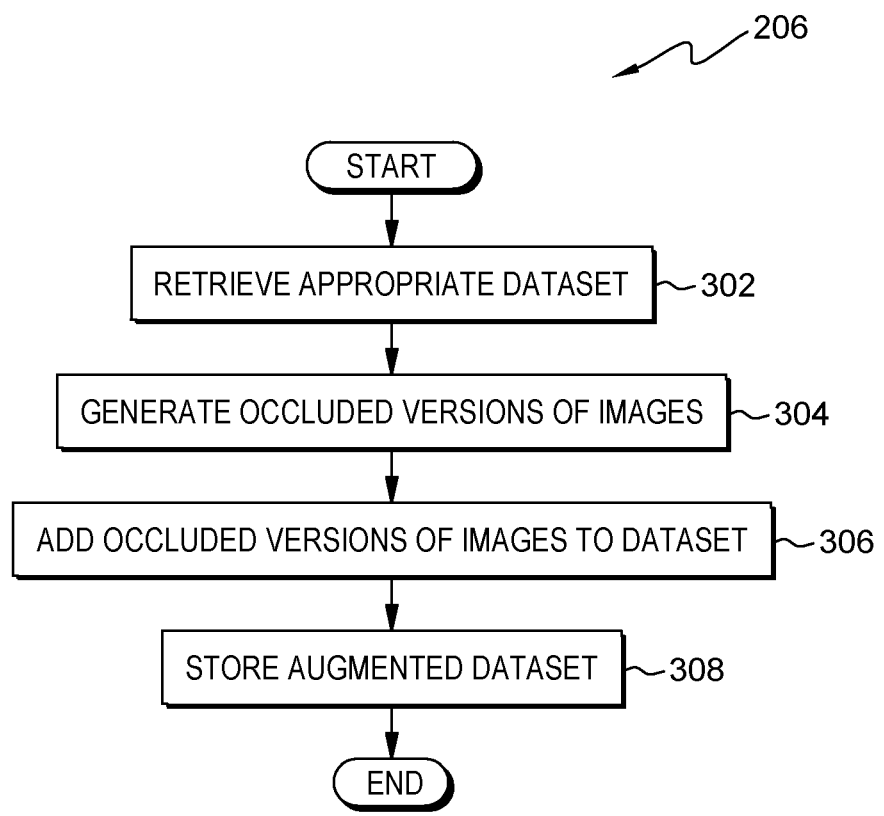
FIG. 3 is a flowchart depicting operational steps of an occluded object identification program, on a server computer within the distributed data processing environment of FIG. 2, for creating training data for a detection model, in accordance with an embodiment of the present invention.

FIG. 3 is a flowchart depicting operational steps of occluded object identification program 206, on server computer 204 within distributed data processing environment 200 of FIG. 2, for creating training data for detection model 208, in accordance with an embodiment of the present invention.

Occluded object identification program 206 retrieves an appropriate dataset (step 302). In an embodiment, occluded object identification program 206 retrieves a dataset of symbols and/or objects associated with a particular type of engineering drawing from database 210. For example, if occluded object identification program 206 is generating training data for electrical schematic drawings, then occluded object identification program 206 retrieves a dataset stored in database 210 associated with electrical schematic drawings.

Occluded object identification program 206 generates occluded versions of images (step 304). In an embodiment, occluded object identification program 206 generates one or more occluded versions of each of the symbol images in the retrieved dataset by adding one or more occlusions to the images to create partial images. For example, occluded object identification program 206 may add occlusions of standard shapes, such as circular or rectangular shaped occlusions. In another example, occluded object identification program 206 may add oddly shaped occlusions to one or more images to simulate non-standard occlusions, such as a drop of ink shaped occlusion.

Occluded object identification program 206 adds the occluded versions of the images to the dataset (step 306). In an embodiment, occluded object identification program 206 augments the retrieved dataset by adding the newly generated occluded versions of the images to the retrieved dataset.

Occluded object identification program 206 stores the augmented dataset (step 308). In an embodiment, occluded object identification program 206 stores the augmented dataset, i.e., the dataset that includes the original symbols and/or objects in addition to the generated occluded versions of the symbols and/or objects, to database 210. The augmented dataset serves as training data for detection model 208. In an embodiment, occluded object identification program 206 trains detection model 208 with the augmented dataset, providing detection model 208 with prior exposure to occluded objects. An advantage of generating the training data and training detection model 208 is that it assists detection model 208 in identifying more occluded objects correctly by learning new key features.

Figure 4:
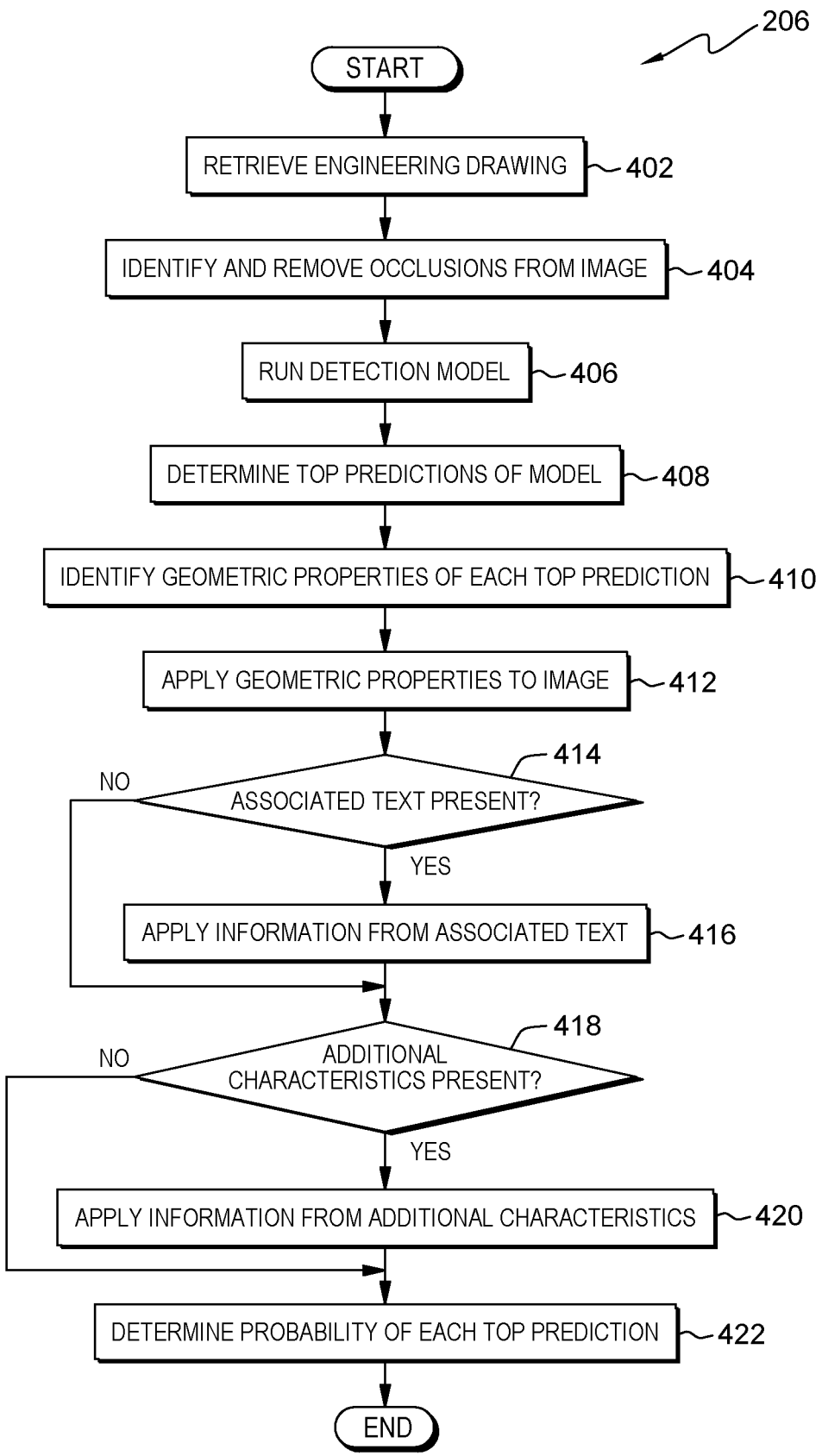
FIG. 4 is a flowchart depicting operational steps of the occluded object identification program, on a server computer within the distributed data processing environment of FIG. 2, for identifying occluded objects in engineering drawings, in accordance with an embodiment of the present invention.

FIG. 4 is a flowchart depicting operational steps of occluded object identification program 206, on server computer 204 within distributed data processing environment 200 of FIG. 2, for identifying occluded objects in engineering drawings, in accordance with an embodiment of the present invention.

Occluded object identification program 206 retrieves an engineering drawing (step 402). In an embodiment, occluded object identification program 206 retrieves one or more engineering drawings from database 210 for analysis of occluded objects. In an embodiment, occluded object identification program 206 receives a request from the user of client computing device 212, via user interface 214, to analyze an engineering drawing which prompts occluded object identification program 206 to retrieve an engineering drawing from database 210. In another embodiment, the user of client computing device 212 sends an engineering drawing to occluded object identification program 206, via user interface 214, and occluded object identification program 206 receives the engineering drawing.

Occluded object identification program 206 identifies and removes one or more occlusions from an image (step 404). In an embodiment, occluded object identification program 206 uses one or more noise elimination techniques, as would be recognized by a person of skill in the art, to identify and remove occluding objects, i.e., occlusions, from the image of the engineering drawing. For example, occluded object identification program 206 can remove occlusions from the image that are not the color black because, unless otherwise specified in the dataset, symbols in an engineering drawing are black. Occlusions such as labels, stamps, wax, and other external substances are most likely to be a different color, for example, red or blue. In another example, occluded object identification program 206 can remove occlusions of indistinct shape from the image, such as smudges or ink blots. In yet another example, occluded object identification program 206 can remove occlusions that are larger than a threshold size, where the threshold indicates a size of an object that is not likely to be a symbol in the dataset, such as a large solid circle. Once occluded object identification program 206 removes the occlusions from the image, the previously occluded objects are partial objects.

Occluded object identification program 206 runs detection model 208 (step 406). In an embodiment, occluded object identification program 206 runs detection model 208, which was previously trained with the training data discussed with respect to FIG. 3. Occluded object identification program 206 runs detection model 208 with the image of the engineering drawing to predict which symbols and/or objects are represented by the partial objects in the image that resulted from removing the occlusions, as discussed with respect to step 406. In an embodiment, detection model 208 assigns a confidence score to each predicted object.

Occluded object identification program 206 determines the top predictions of detection model 208 (step 408). In an embodiment, occluded object identification program 206 determines the most likely symbols to represent the partial symbols from the top predictions that resulted from running detection model 208. In an embodiment, occluded object identification program 206 determines a number of predictions based on a pre-defined threshold. For example, occluded object identification program 206 may determine the top three predictions. In another example, occluded object identification program 206 may determine the top ten percent of the predictions. In an embodiment, occluded object identification program 206 determines the top predictions based on an assigned confidence score, i.e., the predictions with the highest associated confidence score.

Occluded object identification program 206 identifies geometric properties of each top prediction (step 410). In an embodiment, occluded object identification program 206 determines whether a partial object includes one or more geometric properties that can be used to identify the object.

For example, many engineering symbols have vertical, horizontal, and/or rotational symmetry around a well-defined axis of symmetry, which aids in image reconstruction. Based on which side of an object is occluded, occluded object identification program 206 can reflect a partial image around an axis to create a full image. Occluded object identification program 206 can find an axis of symmetry with high confidence by locating the lines that connect the partial symbol to another symbol on either side of the partial symbol, i.e., the connecting terminals. The endpoints of the connecting terminals create an accurate axis. The ability to use geometric properties, such as symmetry, for object identification is an advantage over known techniques that use multiple camera angles with 3D images because geometric properties, such as pose estimation and axis of symmetry location, are difficult with 3D objects.

Occluded object identification program 206 applies the geometric properties to the image (step 412). In an embodiment, occluded object identification program 206 applies an identified geometric property to the partial symbol in the image to enhance the partial symbol such that the partial symbol has a higher probability of being identified correctly. For example, occluded object identification program 206 can reflect the partial symbol across an axis of symmetry to convert the partial image into a full image.

Occluded object identification program 206 determines whether associated text is present (decision block 414). Many engineering symbols include associated text, which can contain useful information and/or context for identifying a partial symbol, such as definitions, usage rules, policies, context, etc. Associated text may be domain specific, e.g., pertaining to electronics or construction. Associated text may include, but is not limited to, units and names. For example, electrical symbols have units that are specific to a limited number of components. In another example, labels typically start with the same letter as the name of the component, limiting the number of candidate components. Associated text may also be inside a symbol. For example, a question mark inside a symbol suggests a decision block in a flowchart. In an embodiment, occluded object identification program 206 determines whether any associated text is within a pre-defined spatial proximity threshold to the partial symbol.

If occluded object identification program 206 determines associated text is present ("yes" branch, decision block 414), then occluded object identification program 206 applies information from the associated text (step 416). In an embodiment, occluded object identification program 206 applies any information determined from the associated text, such as definitions, usage rules, policies, context, etc., to the partial symbol to reduce the remaining ambiguity of the prediction of the identification of the partial symbol. For example, the text "10V" in spatial proximity to a symbol indicates the symbol represents a battery, as "10V" indicates 10 volts. In another example, the text "R2" in spatial proximity to a symbol represents the symbol represents a resistor, as the "R" indicates the first letter of the name of the component represented by the symbol.

Responsive to determining associated text is not present ("no" branch, decision block 414), or responsive to applying information from the associated text, occluded object identification program 206 determines whether any additional characteristics are present (decision block 418). Many engineering symbols include characteristics in addition to those already discussed which can assist in the identification of an occluded symbol by adding additional context, such as definitions, usage rules, policies, context, etc. For example, some engineering symbols include subcomponents, such as a symbol for positive or negative. In another example, connections and/or terminals of a symbol can indicate the function of a symbol. In an embodiment, occluded object identification program 206 determines whether any additional characteristics are within a pre-defined spatial proximity threshold to the partial symbol. The ability to use additional characteristics, such as subcomponents, for object identification is an advantage over known techniques that match localized sections of a given shape using PAD to find curves and/or edges in a given image because finding partially matching curves may not result in object identification with a required accuracy. Key distinguishing curves may be the part of the object that is occluded, and a particular circular symbol, as well as a triangular symbol, may be mistaken for another, while subcomponents of symbols are often the distinguishing feature.

If occluded object identification program 206 determines additional characteristics are present ("yes" branch, decision block 418), then occluded object identification program 206 applies information from the additional characteristics (step 420). In an embodiment, occluded object identification program 206 applies any information determined from the additional characteristics, such as definitions, usage rules, policies, context, etc., to the partial symbol to reduce any remaining ambiguity of the prediction of the identification of the partial symbol. For example, a symbol for positive or negative can be used to distinguish a diode from an op amp. In another example, a decision block in a flowchart has three connections versus a data block that has two connections. In yet another example, a ground has one connection versus a vertical diode that has two connections.

Responsive to determining additional characteristics are not present ("no" branch, decision block 418), or responsive to applying information from the additional characteristics, occluded object identification program 206 determines the probability of each top prediction being the correctly identified occluded object (step 422). In an embodiment, occluded object identification program 206 aggregates the contextual properties applied in step 412 and/or step 416 and/or step 420 to determine the probability of each of the top predictions of possible symbols determined by detection model 208 as being correct. The ability to use contextual information, such as associated text and additional characteristics, for object identification is an advantage over known techniques that analyze captions of an image to generate a list of objects present in the image, and then feed the list to a word-to-vector model to predict the likelihood of the missing object based on relational graphs because the presence of an engineering symbol provides little implication for the presence of another symbol, and, therefore, an applicable word-to-vector model and relational graph cannot be produced. In an embodiment, occluded object identification program 206 uses one or more known statistical techniques to determine the probability. In an embodiment, occluded object identification program 206 stores the determined probabilities in database 210.

In an embodiment, occluded object identification program 206 determines whether at least one of the probabilities exceeds a pre-defined threshold. For example, occluded object identification program 206 determines whether at least one of the top predictions for the probability of the occluded/partial symbol is greater than 90 percent. In the embodiment, if occluded object identification program 206 determines that none of the top predictions has a probability that exceeds the pre-defined threshold, then occluded object identification program 206 returns to the original dataset and generates additional training data, as discussed with respect to FIG. 3.

In an embodiment where occluded object identification program 206 was prompted by a request from the user of client computing device 212, occluded object identification program 206 communicates the results to the user. For example, occluded object identification program 206 may transmit a notification to the user, via user interface 214, that includes the results, i.e., the probability of at least one of the top predictions being an identified symbol. In another example, occluded object identification program 206 may transmit a notification to the user, via user interface 214, that includes a link to the results stored in database 210.

Figure 5:
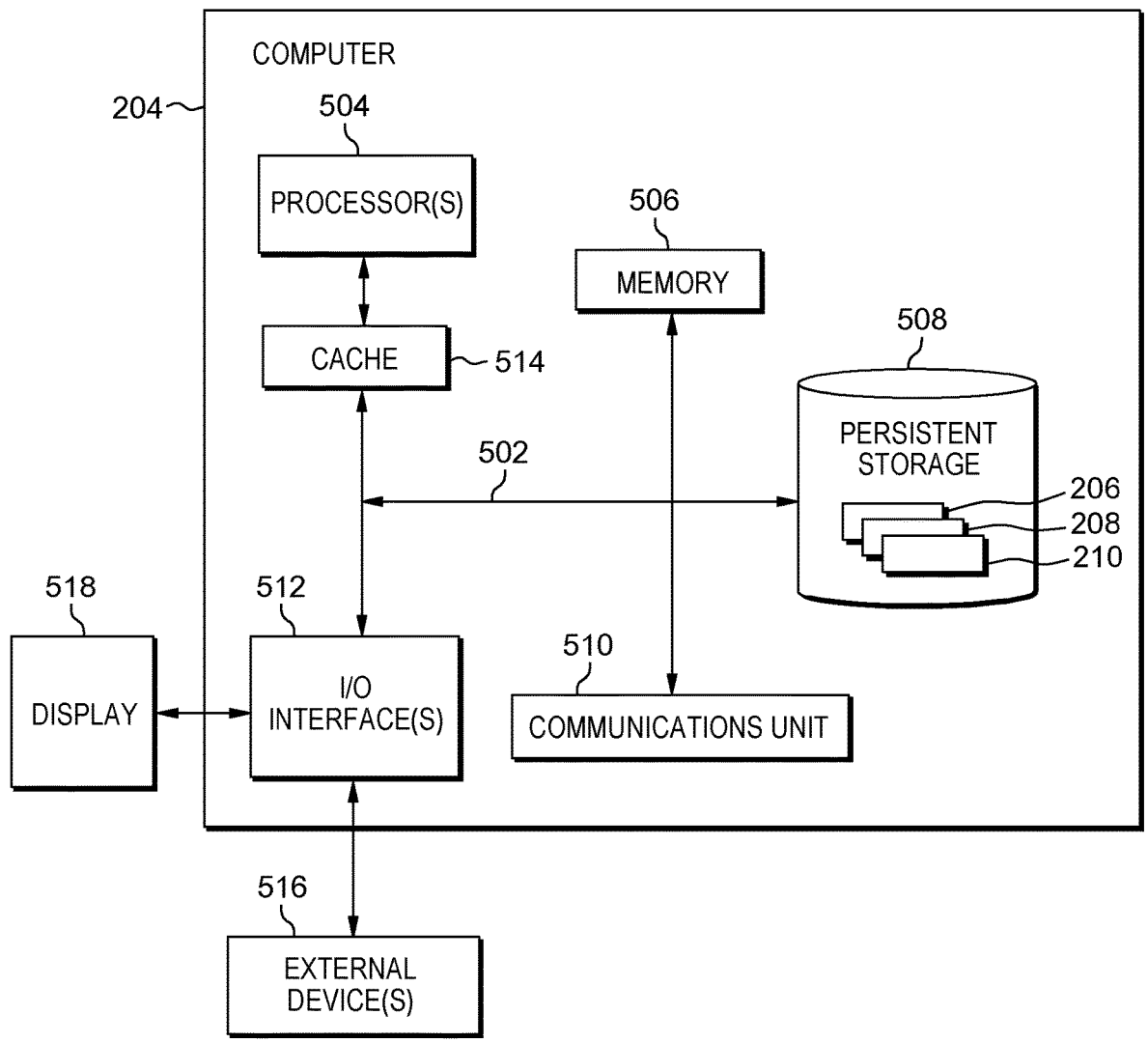
FIG. 5 depicts a block diagram of components of the server computer executing the occluded object identification program within the distributed data processing environment of FIG. 2, in accordance with an embodiment of the present invention.

FIG. 5 depicts a block diagram of components of server computer 204 within distributed data processing environment 200 of FIG. 2, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Server computer 204 can include processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention, e.g., occluded object identification program 206, detection model 208, and database 210, are stored in persistent storage 508 for execution and/or access by one or more of the respective processor(s) 504 of server computer 204 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of client computing device 212. In these examples, communications unit 510 includes one or more network interface cards. Communications unit 510 may provide communications through the use of either or both physical and wireless communications links. Occluded object identification program 206, detection model 208, database 210, and other programs and data used for implementation of the present invention, may be downloaded to persistent storage 508 of server computer 204 through communications unit 510.

I/O interface(s) 512 allows for input and output of data with other devices that may be connected to server computer 204. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media such as, for example, thumb drives, portable optical or magnetic disks, and memory cards. Software and data used to practice embodiments of the present invention, e.g., occluded object identification program 206, detection model 208, and database 210 on server computer 204, can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for identifying obscured objects from drawings by using a detection model that has been trained from an appropriate dataset comprising:

retrieving, by one or more computer processors, a first image that includes an object at least partially occluded by one or more occlusions;

removing, by one or more computer processors and by relying on a noise elimination technique, the one or more occlusions from the first image to create a second image, wherein the second image includes a partial object from the first image;

running, by one or more computer processors, a detection model with the second image to predict one or more identifications of a symbol represented by the partial object;

generating one or more confidence scores associated with results from the detection model;

determining, by one or more computer processors, one or more top predictions, based on a pre-defined prediction threshold, of the one or more identifications of the symbol by the detection model, wherein the one or more top predictions is based on an assigned confidence score;

identifying, by one or more computer processors, at least one geometric property associated with the one or more identifications of the symbol included in the one or more top predictions;

applying, by one or more computer processors, the at least one geometric property to the partial object;

based on the applied at least one geometric property, determining, by one or more computer processors, a probability of each of the one or more top predictions correctly identifying the symbol represented by the partial object;

retrieving, by one or more computer processors, a dataset of one or more images of objects associated with a type of the first image, wherein the dataset comprises of electrical schematic;

generating, by one or more computer processors, at least one version of each of the one or more images that includes at least one occlusion;

augmenting, by one or more computer processors, the dataset by adding the generated at least one version of each of the one or more images that includes at least one occlusion to the dataset;

storing, by one or more computer processors, the augmented dataset; and training, by one or more computer processors, the detection model with the augmented dataset.

2. The computer-implemented method of claim 1, wherein the at least one geometric property is an axis of symmetry.

3. The computer-implemented method of claim 1, further comprising:

determining, by one or more computer processors, that text associated with the partial object is present in the second image;

applying, by one or more computer processors, the text associated with the partial object to the partial object; and wherein determining the probability of each of the one or more top predictions correctly identifying the symbol represented by the partial object is further based on the applied text associated with the partial object.

4. The computer-implemented method of claim 3, wherein the associated text is within a pre-defined spatial proximity threshold to the partial object.

5. The computer-implemented method of claim 1, further comprising:

determining, by one or more computer processors, that one or more additional characteristics associated with the partial object are present in the second image;

applying, by one or more computer processors, the one or more additional characteristics associated with the partial object to the partial object; and wherein determining the probability of each of the one or more top predictions correctly identifying the symbol represented by the partial object is further based on the one or more additional characteristics associated with the partial object.

6. The computer-implemented method of claim 5, wherein the one or more additional characteristics include at least one of: a subcomponent, a symbol for positive, a symbol for negative, a number of connections, a number of terminals, and an arrow.

7. The computer-implemented method of claim 1, wherein the one or more occlusions comprises, labels, stamps, wax, smudges, ink blots and other external substances.

8. The computer-implemented method of claim 7, wherein the pre-defined prediction threshold further comprises, a top three predictions, a top ten percent of predictions or highest associated confidence score.

9. A non-transitory computer program product for identifying obscured objects from drawings by using a detection model that has been trained from an appropriate dataset comprising:

one or more computer readable storage media and program instructions collectively stored on the one or more computer readable storage media, the stored program instructions comprising:

program instructions to retrieve a first image that includes an object at least partially occluded by one or more occlusions;

program instructions to remove and by relying on a noise elimination technique the one or more occlusions from the first image to create a second image, wherein the second image includes a partial object from the first image;

program instructions to run a detection model with the second image to predict one or more identifications of a symbol represented by the partial object;

program instructions to generate one or more confidence scores associated with results from the detection model;

program instructions to determine one or more top predictions, based on a pre-defined prediction threshold, of the one or more identifications of the symbol by the detection model, wherein the one or more top predictions is based on an assigned confidence score;

program instructions to identify at least one geometric property associated with the one or more identifications of the symbol included in the one or more top predictions;

program instructions to apply the at least one geometric property to the partial object;

based on the applied at least one geometric property, program instructions to determine a probability of each of the one or more top predictions correctly identifying the symbol represented by the partial object;

program instructions to retrieve a dataset of one or more images of objects associated with a type of the first image, wherein the dataset comprises of electrical schematic;

program instructions to generate at least one version of each of the one or more images that includes at least one occlusion;

program instructions to augment the dataset by adding the generated at least one version of each of the one or more images that includes at least one occlusion to the dataset;

program instructions to store the augmented dataset; and program instructions to training the detection model with the augmented dataset.

10. The non-transitory computer program product of claim 9, the stored program instructions further comprising:

program instructions to determine that text associated with the partial object is present in the second image;

program instructions to apply the text associated with the partial object to the partial object; and wherein determining the probability of each of the one or more top predictions correctly identifying the symbol represented by the partial object is further based on the applied text associated with the partial object.

11. The non-transitory computer program product of claim 9, the stored program instructions further comprising:

program instructions to determine that one or more additional characteristics associated with the partial object are present in the second image;
program instructions to apply the one or more additional characteristics associated with the partial object to the partial object; and
wherein determining the probability of each of the one or more top predictions correctly identifying the symbol represented by the partial object is further based on the one or more additional characteristics associated with the partial object.

12. The non-transitory computer program product of claim 11, wherein the one or more additional characteristics include at least one of: a subcomponent, a symbol for positive, a symbol for negative, a number of connections, a number of terminals, and an arrow.

13. The non-transitory computer program product of claim 9, wherein the one or more occlusions comprises, labels, stamps, wax, smudges, ink blots and other external substances.

14. The non-transitory computer program product of claim 13, wherein the pre-defined prediction threshold further comprises, a top three predictions, a top ten percent of predictions or highest associated confidence score.

15. A computer system for identifying obscured objects from drawings by using a detection model that has been trained from an appropriate dataset comprising:
one or more computer processors;
one or more computer readable storage media;
program instructions collectively stored on the one or more computer readable storage media for execution by at least one of the one or more computer processors, the stored program instructions comprising:
program instructions to remove and by relying on a noise elimination technique the one or more occlusions from the first image to create a second image, wherein the second image includes a partial object from the first image;
program instructions to run a detection model with the second image to predict one or more identifications of a symbol represented by the partial object;
program instructions to generate one or more confidence scores associated with results from the detection model;
program instructions to determine one or more top predictions of the one or more identifications of the symbol by the detection model, wherein the one or more top predictions is based on an assigned confidence score;
program instructions to identify at least one geometric property associated with the one or more identifications of the symbol included in the one or more top predictions;
program instructions to apply the at least one geometric property to the partial object;
based on the applied at least one geometric property, program instructions to determine a probability of each of the one or more top predictions correctly identifying the symbol represented by the partial object;
program instructions to retrieve a dataset of one or more images of objects associated with a type of the first image, wherein the dataset comprises of electrical schematic;
program instructions to generate at least one version of each of the one or more images that includes at least one occlusion;
program instructions to augment the dataset by adding the generated at least one version of each of the one or more images that includes at least one occlusion to the dataset;
program instructions to store the augmented dataset; and
program instructions to training the detection model with the augmented dataset.

16. The computer system of claim 15, the stored program instructions further comprising:
program instructions to determine that text associated with the partial object is present in the second image;
program instructions to apply the text associated with the partial object to the partial object; and
wherein determining the probability of each of the one or more top predictions correctly identifying the symbol represented by the partial object is further based on the applied text associated with the partial object.

17. The computer system of claim 15, the stored program instructions further comprising:
program instructions to determine that one or more additional characteristics associated with the partial object are present in the second image;
program instructions to apply the one or more additional characteristics associated with the partial object to the partial object; and
wherein determining the probability of each of the one or more top predictions correctly identifying the symbol represented by the partial object is further based on the one or more additional characteristics associated with the partial object.

18. The computer system of claim 17, wherein the one or more additional characteristics include at least one of: a subcomponent, a symbol for positive, a symbol for negative, a number of connections, a number of terminals, and an arrow.

19. The computer system of claim 15, wherein the one or more occlusions comprises, labels, stamps, wax, smudges, ink blots and other external substances.

20. The computer system of claim 19, wherein the pre-defined prediction threshold further comprises, a top three predictions, a top ten percent of predictions or highest associated confidence score.

* * * * *